US009855586B2

(12) United States Patent
Chirol et al.

(10) Patent No.: US 9,855,586 B2
(45) Date of Patent: Jan. 2, 2018

(54) EQUIPMENT FOR SORTING ARTICLES INTO BAGS

(71) Applicant: Solystic, Bagneux (FR)

(72) Inventors: Luc Chirol, Paris (FR); Emmanuel Miette, Saint Gratien (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 15/319,034

(22) PCT Filed: May 19, 2016

(86) PCT No.: PCT/FR2016/051179
§ 371 (c)(1),
(2) Date: Dec. 15, 2016

(87) PCT Pub. No.: WO2016/193565
PCT Pub. Date: Dec. 8, 2016

(65) Prior Publication Data
US 2017/0128985 A1    May 11, 2017

(30) Foreign Application Priority Data

Jun. 4, 2015    (FR) ..................................... 15 55086

(51) Int. Cl.
*B07C 3/02* (2006.01)
*B65G 1/08* (2006.01)
(Continued)

(52) U.S. Cl.
CPC ................. *B07C 3/02* (2013.01); *B07C 3/14* (2013.01); *B07C 3/18* (2013.01); *B65G 1/026* (2013.01); *B65G 1/08* (2013.01)

(58) Field of Classification Search
CPC .. B07C 3/00; B07C 3/02; B65G 1/026; B65G 1/0492; B65G 1/065; B65G 1/08; B65G 1/12
See application file for complete search history.

(56) References Cited

U.S. PATENT DOCUMENTS 5,050,743 A * 9/1991 Lazzarotti ................. B07C 7/02
   211/12
5,233,814 A * 8/1993 Bergerioux ............. B07C 1/025
   53/241

(Continued)

FOREIGN PATENT DOCUMENTS

WO    2014/057182 A1    4/2014

*Primary Examiner* — Joseph C Rodriguez
(74) *Attorney, Agent, or Firm* — Ware, Fressola, Maguire & Barber LLP

(57) ABSTRACT

Sorting equipment for sorting articles (3), into receptacles (6) that are open at their tops, comprises shuttle cart and trolley assemblies (2) that can move independently so that each of them moves an article from a loading point (4) to a receptacle, wherein each shuttle cart and trolley assembly has a carrying deck (10) for carrying an article, which deck is suitable for overlying the opening in the top of a receptacle, and retaining means (16) above the openings in the receptacles, which leave a space (18) for allowing a carrying deck to pass between the retaining means and the opening in a receptacle, and retain the article loaded on the carrying deck above the opening in the receptacle when the shuttle cart and trolley assembly moves away from the receptacle in such a manner that the article falls by gravity into the receptacle.

8 Claims, 1 Drawing Sheet

(51) Int. Cl.
*B07C 3/14* (2006.01)
*B07C 3/18* (2006.01)
*B65G 1/02* (2006.01)

(56) References Cited

U.S. PATENT DOCUMENTS

| | | | | |
|---|---|---|---|---|
| 5,347,790 | A * | 9/1994 | Romanenko | B07C 3/008 |
| | | | | 414/790.3 |
| 5,676,514 | A * | 10/1997 | Higman | B61B 13/04 |
| | | | | 198/349 |
| 6,652,213 | B1 * | 11/2003 | Mitchell | B65G 1/0492 |
| | | | | 414/279 |
| 6,762,382 | B1 * | 7/2004 | Danelski | B07C 5/36 |
| | | | | 198/370.04 |
| 7,861,844 | B2 * | 1/2011 | Hayduchok | B07C 3/087 |
| | | | | 198/370.1 |
| 7,866,936 | B2 * | 1/2011 | Schuck | B65G 65/00 |
| | | | | 271/213 |
| 9,436,184 | B2 * | 9/2016 | D'Andrea | B66F 9/063 |
| 9,486,838 | B2 * | 11/2016 | Miette | G06Q 10/087 |
| 9,514,430 | B2 * | 12/2016 | Miette | B07C 3/02 |
| 2005/0047895 | A1 * | 3/2005 | Lert, Jr. | B65G 1/0492 |
| | | | | 414/273 |
| 2012/0051874 | A1 * | 3/2012 | Berdelle-Hilge | B07C 3/02 |
| | | | | 414/222.01 |
| 2014/0124462 | A1 * | 5/2014 | Yamashita | B65G 1/0414 |
| | | | | 211/1.57 |
| 2014/0205402 | A1 * | 7/2014 | Caron | B65H 1/025 |
| | | | | 414/373 |
| 2014/0277693 | A1 * | 9/2014 | Naylor | B65G 1/0492 |
| | | | | 700/218 |
| 2017/0183158 | A1 * | 6/2017 | Zhu | B65G 1/1373 |

* cited by examiner

EQUIPMENT FOR SORTING ARTICLES INTO BAGS

CROSS REFERENCE TO RELATED APPLICATIONS

This application is the U.S. National Stage of International Application Number PCT/FR2016/051179 filed on May 19, 2016, which application claims priority under 35 USC §119 to French Patent Application No. 1555086 filed on Jun. 4, 2015. Both applications are hereby incorporated by reference in their entirety.

TECHNICAL FIELD

The invention relates to the field of sorting articles, and more particularly to postal sorting equipment for sorting postal articles, such as parcels, into receptacles, such as bags, that are open at their tops.

BACKGROUND OF THE INVENTION

Currently, sorting postal parcels at low throughput rates is not automated very much in sorting centers.

Such "low" throughput rates are rates that can be up to three thousand parcels per hour.

This type of sorting is generally performed manually by specialist operators who take the parcels one-by-one from a take point, who visually recognize a destination on a parcel that has been taken, and then, as a function of a certain sorting plan, determine the sorting bag into which the parcels should be put.

The sorting bags can then be recovered for delivery on a delivery round or "postman's walk" or be emptied for sorting the parcels in a new sorting pass.

Thus, the sorting rate at which parcels are sorted in such sorting centers depends essentially on the number of operators at work there and on their skill at sorting the parcels into the bags as a function of the sorting plan.

It can also be understood that the sorting plans changing at every sorting pass requires a substantial effort of concentration on the part of the operators, and that can give rise to sorting errors.

It should also be noted that sorting machines exist that are fully automated, that can be referred to as "shoe line sorters", and that are used for sorting certain postal articles.

However, those machines are ill-suited for postal sorting at low throughput rates due to their costs being too high and to the floor area or "footprint" they occupy being too large.

Sorting equipment also exists for sorting articles into receptacles that are open at their tops as described in Document WO 2014/057182. That equipment comprises self-propelled shuttle cart and trolley assemblies that move independently, each conveying an article from a loading point to a receptacle, each of the shuttle cart and trolley assemblies having a carrying deck or rack for carrying an article, which deck is suitable for overlying the opening in the top of a receptacle.

SUMMARY OF THE INVENTION

An object of the invention is thus to provide a solution for limiting intervention by operators in parcel postal sorting, while also guaranteeing the parcels are sorted at a good sorting rate.

An object is also to propose an automated solution that is reliable and cost-effective for handling parcels at low throughput rates, and that is adapted for dynamically managing several sorting passes.

The basic idea of the invention is to move the parcels or other postal articles on shuttle cart and trolley assemblies to the bags from a loading point at which the parcels are loaded, the bags and the shuttle cart and trolley assemblies being adapted so that unloading a parcel from a trolley into a bag takes place merely by gravity.

To this end, the invention provides equipment for sorting articles, for sorting the articles into receptacles that are open at their tops, said equipment being characterized in that it comprises shuttle cart and trolley assemblies that are suitable for being moved independently so that each of them conveys an article from a loading point to a receptacle, in that each of the shuttle cart and trolley assemblies has a carrying deck for carrying an article, which deck is suitable for overlying the opening in the top of a receptacle, and in that retaining means are provided above the openings in the receptacles, which retaining means leave a space for allowing a carrying deck to pass between the retaining means and the opening in a receptacle, and retain the article loaded on the carrying deck above the opening in the receptacle when the shuttle cart and trolley assembly moves away from the receptacle in such a manner that the article falls by gravity into the receptacle.

The sorting apparatus of the invention may advantageously have the following features:

- the receptacles are lined up in a row and each shuttle cart and trolley assembly is controlled to move along the row of receptacles in such a manner that the carrying deck of the shuttle cart and trolley assembly overlies the receptacles in succession;
- the receptacles are bags suspended from frames and each of the shuttle cart and trolley assemblies is in the shape of a U on its side, with a lower branch of the U-shape that is adapted to go under the suspended bags, and an upper branch of the U-shape that is adapted to overlie the openings in the bags; and
- the retaining means are constituted by a stationary paddle suspended above the bags.

BRIEF DESCRIPTION OF THE DRAWINGS

The present invention can be better understood and other advantages appear on reading the following detailed description of an embodiment given by way of non-limiting example and with reference to the accompanying drawing, in which.

DESCRIPTION OF EMBODIMENTS

The sorting equipment of the invention is designed to sort articles, and more particularly non-machine-sortable postal articles of the parcel type, at a low throughput rate.

Figure 1:
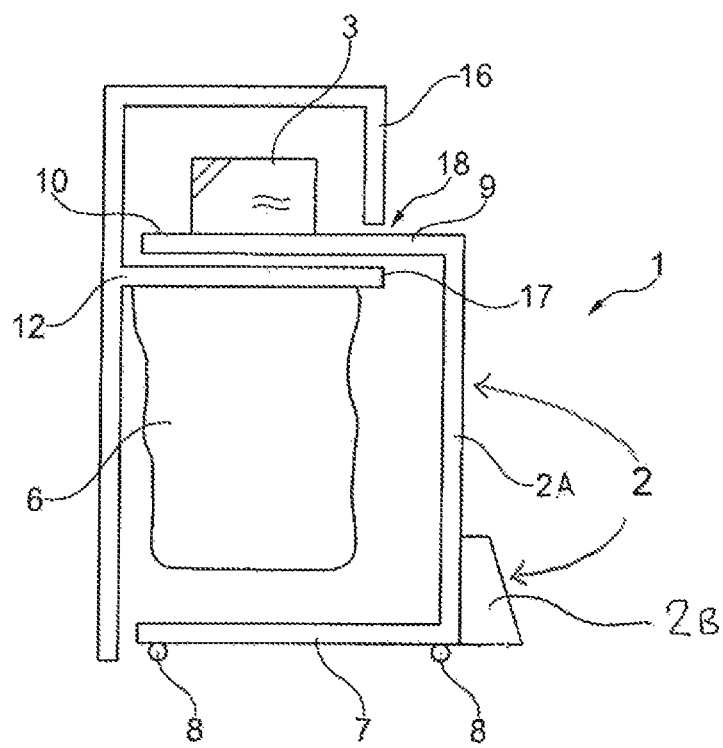
FIG. 1 is a diagrammatic view of sorting equipment of the invention seen in profile.
Figure 2:
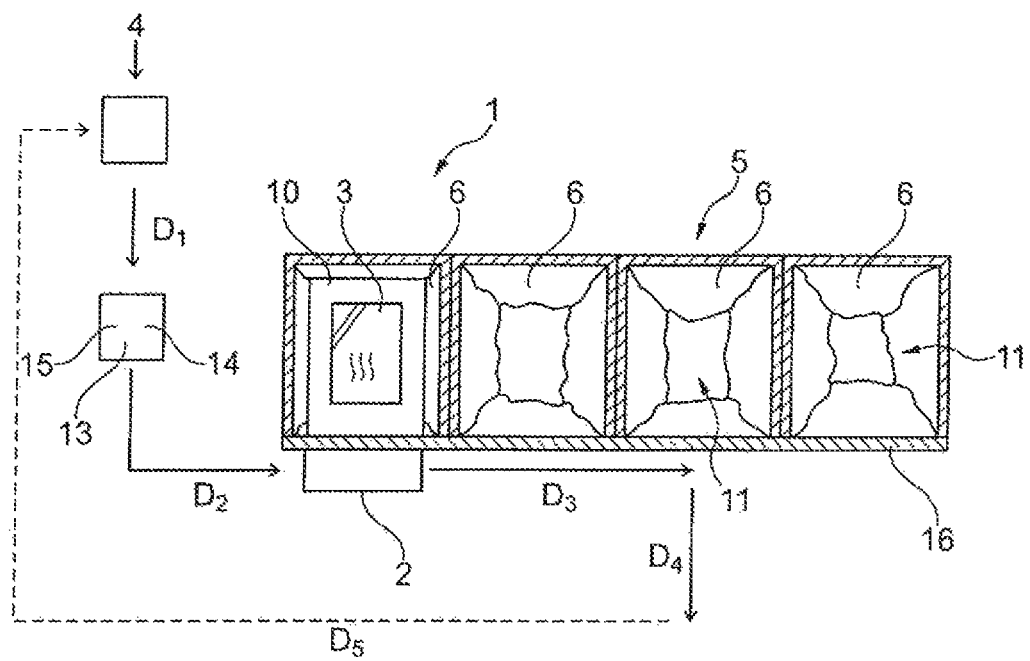
FIG. 2 is a diagrammatic view of sorting equipment of the invention seen from above.

With reference to FIGS. 1 and 2, the sorting equipment 1 of the invention comprises shuttle cart and trolley assemblies 2, each of which is made up of a trolley 2A for carrying a parcel 3 and of a shuttle cart 2B for moving the parcel 3 placed on the trolley 2A.

The trolley 2A and the shuttle cart 2B may optionally be designed to be coupled to each other in a detachable manner.

Each shuttle cart 2B is an independent self-propelled shuttle cart capable of moving from a loading point 4 at which the parcels 3 are loaded and which is shown in FIG. 2 to unloading points 5 at which the parcels are unloaded and at which receptacles 6 are placed, each of which receptacles has an opening in its top, the receptacles being suspended bags in this example.

The receptacles may also be trays, boxes such as box pallets, or like containers.

As can be seen in FIG. 1, each trolley 2A is in the shape of a U on its side, with a lower branch 7 above the wheels 8 and an upper branch 9 on which a horizontal carrying deck 10 is fastened.

As shown in FIG. 1, the deck 10 on the branch 9 of the U-shape is suitable for coming to overly the opening in the top of the bag 6 when the lower branch 7 of the U-shape is under the bag 6.

In FIG. 2, the openings 11 in the tops of the bags 6 can be seen, the bags being lined up in one or more longitudinal rows. In FIG. 2, only one row of bags is shown.

The bags 6 in the row thus constitute the sorting outlets for a postal sorting process performed on the parcels following a certain sorting plan and in one or more sorting passes.

It is possible to have receptacles (bags) 6 of different sizes adapted to different rates of filling with parcels depending on the sorting outlets.

FIG. 2 very diagrammatically shows a monitoring and control system 13 for monitoring and controlling the shuttle cart and trolley assemblies 2, which system includes, in this example, an automatic address recognition system 14 having a camera 15 that is mounted at some height so that it can observe the top face of each parcel 3 placed on the carrying deck 10 of a shuttle cart and trolley assembly 2 passing under the camera.

It should be understood that the shuttle cart and trolley assemblies 2 are remote controlled in wireless manner by geolocation from the system 13.

The automatic address recognition system 14 may be a conventional system using Optical Character Recognition (OCR) adapted to recognize a destination address on the parcel on the basis of a digital image of the parcel taken by the camera 15 and containing said destination address.

It should be understood that the system 14 may also be a bar code reader suitable for reading bar codes on the parcels.

As can be seen in FIG. 2, the shuttle cart and trolley assemblies 2 are controlled by the system 13 so that they follow a path made up of the segments D1, D2, D3, D4, and D5.

The segment D1 goes from the loading point 4 at which a parcel is loaded onto the deck of a shuttle cart and trolley assembly arriving, for example, from a storage zone (not shown).

In this example, the segment D1 ends at the place at which the address recognition system 14 is situated.

The segment D2 extends the segment D1 and forms a 90° angle therewith to reach one end of a row of bags or other receptacles.

At the end of the segment D2, the shuttle cart and trolley assembly 2 is aligned with the bags 6 and the shuttle cart 2A of the shuttle cart and trolley assembly can thus travel along the edge of this row of bags by following the longitudinal path D3.

The parcel 3 is then moved above the successive openings 11 in the bags.

As shown in FIG. 1, retaining means 16 are provided over the top of each opening 11 in a receptacle, which retaining means leave space 18 for allowing a carrying deck to pass through between the retaining means and the opening in the receptacle, and retain the article 3 loaded on the carrying deck above the opening in the receptacle while the shuttle cart and trolley assembly 1 moves away from the receptacle, in this example by following the segment D4 that is perpendicular to the segment D3.

Moving the carrying deck 10 of the shuttle cart and trolley assembly 2 away from the bag 6 along the segment D4 causes the parcel 3 to fall by gravity into the bag 6 shown in FIG. 2.

The retaining means 16 may be in the form of a paddle formed by a dropped edge of the suspension frame 17 from which the bag 6 is suspended, which paddle leaves a through slot between it and the edge of the opening in the bag.

It is also possible to have, as retaining means, a large paddle that extends over the entire length of the row of bags 6.

The segment D4 is extended by a last segment D5 that forms a right angle with it and that returns to the loading point 4.

It can thus be understood that a deck 10 of a shuttle cart and trolley assembly is suitable, with a parcel 3 on it, for overlying the bags 6 in succession, and, when it arrives above a bag corresponding to a respective sorting outlet 5, the shuttle cart and trolley assembly is reversed along the segment D4 and the parcel 3 as retained by the paddle 16 comes to fall, merely by gravity, into the bag 6 constituting the sorting outlet.

With this arrangement, it is possible for there to be only one operator, who loads parcels onto the shuttle cart and trolley assemblies 2 arriving one-by-one at the loading point 4, with the sorting then taking place automatically under the control of the system 13.

Also, in accordance with the invention, it is possible to have a plurality of loading points 4 for loading parcels 3 onto the shuttle cart and trolley assemblies 2.

If the sorting includes a plurality of sorting passes, the bags 6 can be removed from the suspension frames 17 by the operator and replaced with empty bags, the full bags being put into sequence at point 4 for a new parcel sorting pass.

What is claimed is:

1. A sorting equipment for sorting articles, into receptacles that are open at their tops, comprising:
    shuttle cart and trolley assemblies that are configured to move independently of other shuttle cart and trolley assemblies so that each shuttle cart and trolley assembly conveys an article from a loading point to a receptacle, wherein each of the shuttle cart and trolley assemblies has a carrying deck for carrying an article, which deck is configured to overlie an opening in the top of the receptacle, and
    retaining means positioned above the openings in the receptacles, each retaining means having a space for allowing a carrying deck to pass between the retaining means and the opening in a receptacle, and retain the article loaded on the carrying deck above the opening in the receptacle when the shuttle cart and trolley assembly moves away from the receptacle in such a manner that the article falls by gravity into the receptacle.

2. The sorting equipment according to claim 1, wherein in that the receptacles are lined up in a row and each shuttle cart and trolley assembly is controlled to move along the row of receptacles in such a manner that the carrying deck of the shuttle cart and trolley assembly overlies the receptacles in succession.

3. The sorting equipment according to claim 2, wherein the receptacles are bags suspended from frames and each of the shuttle cart and trolley assemblies is in the shape of a U on its side, with a lower branch of the U-shape that is adapted to go under the suspended bags, and an upper branch of the U-shape that is adapted to overlie the openings in the bags.

4. The sorting equipment according to claim 3, wherein the retaining means is a paddle suspended above the bags.

5. The sorting equipment according to claim 4, wherein the articles are postal articles.

6. The sorting equipment according to claim 1, wherein the receptacles are bags suspended from frames and each of the shuttle cart and trolley assemblies is in the shape of a U on its side, with a lower branch of the U-shape that is adapted to go under the suspended bags, and an upper branch of the U-shape that is adapted to overlie the openings in the bags.

7. The sorting equipment according to claim 1, wherein the retaining means is a paddle suspended above the bags.

8. The sorting equipment according to claim 1, wherein the articles are postal articles.

\* \* \* \* \*